G. Parnell,
Feed Cutter.
No. 98,997.    Patented Jan. 18, 1870.
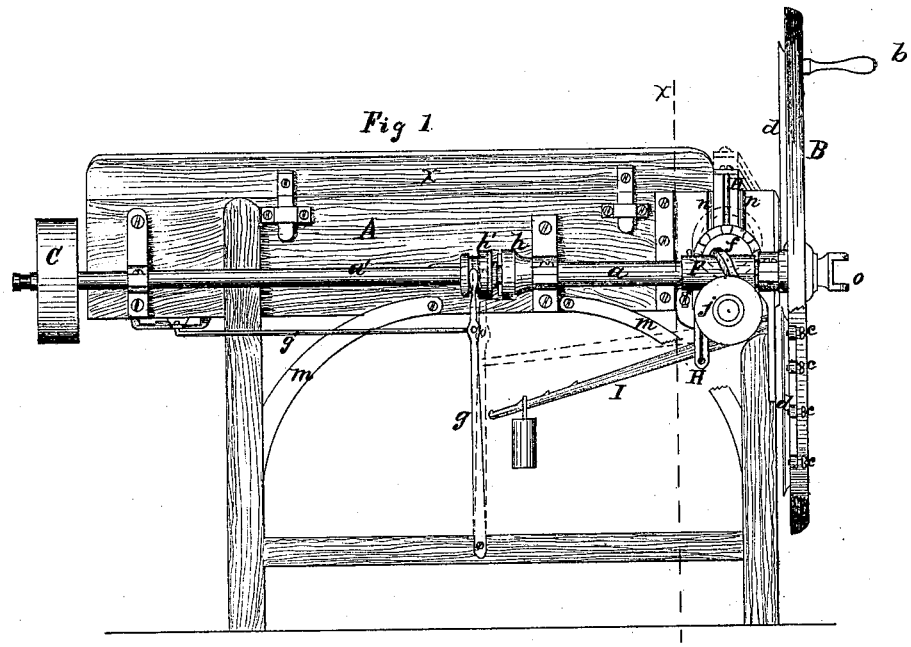
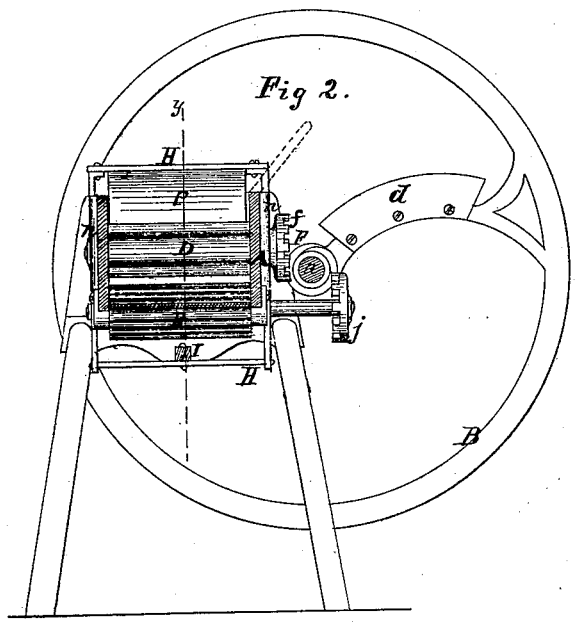
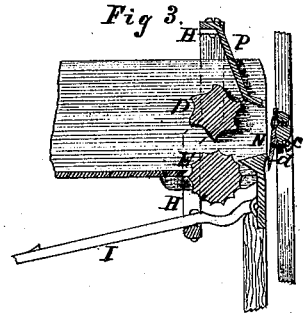
Witnesses:
F. H. Clement
Ira A. Hibbards
Inventor:
G. Parnell,
By Loughborough
Atty

United States Patent Office.

GEORGE PARNELL, OF ONTARIO, NEW YORK.

Letters Patent No. 98,997, dated January 18, 1870.

---

IMPROVEMENT IN FEED-CUTTERS.

---

The Schedule referred to in these Letters Patent and making part of the same.

---

*To all whom it may concern:*

Be it known that I, GEORGE PARNELL, of Ontario, in the county of Wayne, and State of New York, have invented certain new and useful Improvements in Feed-Cutters; and I do hereby declare that the following is a full, clear, and exact description thereof, reference being had to the accompanying drawings, making part of this specification, in which—

Figure 1 is a side elevation of my invention, showing a portion of the fly-wheel broken away.

Figure 2 is an elevation of those parts to the right of the dotted line $x$, fig. 1.

Figure 3 is a longitudinal section at the dotted line $y$, fig. 2.

My invention relates to that class of feed-cutters in which the knives are attached to a wheel revolving upon an axis at right angles to the feed-rollers; and To enable others to make and use the same, I will describe its construction and operation.

The feed-box, A, of my machine, is supported upon legs, in the usual manner, and the fly-wheel B, to which the knives are attached, is fixed to the shaft $a$, running in boxes secured to the sides of the feed-box. This shaft is driven by the handle $b$, or by a belt upon the pulley C, at the rear of the machine.

The knives $d$ are of segmental form, and are secured to the arms of the wheel B by bolts or screws, as shown in fig. 2. To adjust these knives, I provide set-screws, $c$, figs. 1 and 3, screwed into the arms, upon the side opposite the retaining-screws, as shown in fig. 3.

It will be seen that the cutting-edges of the knives can thus be adjusted laterally, so as to cut close to the face of the throat-plate N.

The drive-shaft is made in two detachable sections, $a$ and $a'$, fig. 1, the inner end of $a'$ having a bearing in the end of the clutch-coupling $h$.

The clutch $h'$ slides easily upon the shaft $a'$, and is prevented from revolving thereupon by a suitable spline.

A forked lever, $g$, working in a groove in the sliding clutch, and pivoted, at the lower end, to the frame of the machine, couples and uncouples the shafts, as shown in dotted lines in fig. 1.

A rod, $g'$, may be pivoted to this lever, and to a hand-lever extending across the machine to a point convenient to the operator. This arrangement permits the machine to be stopped and started at pleasure, when driven by power, and also the shaft $a'$ to be disconnected, when working by hand.

The feed-rollers D and E, figs. 2 and 3, are driven by a worm, F, figs. 1 and 2, upon the drive-shaft, meshing into the crown-wheels $f$ and $j$, secured to the axles of the rollers, the centre of one of which is above and that of the other below the centre of the drive-shaft. The motion of the shaft $a$ thus revolves the feed-rollers in opposite directions.

The upper roller D is boxed to a frame, H, which has a suitable vertical movement in the guides $n$, cast upon the side of the machine.

This roller is retained upon the feed by a weighted lever, I, pivoted to the machine, and acting upon the lower part of the frame H.

The flutings of the roller D are formed in section, like an "ogee," as shown in fig. 2, by which their projecting edges are somewhat hooked forward in the direction of revolution, in such a manner as to draw the material toward the knives uniformly and effectually.

The roller E may be fluted, as shown, to assist the action of the upper roller, but it will operate nearly as well when plain.

The crown-gears $f$ and $j$, whose axes are upon opposite sides of the drive-shaft vertically, are themselves arranged upon opposite sides of the worm F laterally, as shown in fig. 2. By this means, the upper roller D and crown-wheel $f$ are allowed considerable vertical movement, without the liability of the latter getting out of gear with the worm, or interfering with the lower wheel. The wear upon the worm and the teeth of the crown-wheels is also more uniform than if both gears were located on the same side of the worm.

The guard-plate $p$, fig. 3, is secured to the frame H, and extends down in front of the feed-roller D, to prevent cut material from being carried back into the box.

An extension, $x$, may be applied to the feed-box, to prevent loose feed from becoming tangled in the drive-shaft and gearing.

The side-bars of the frame H are offset, as shown in dotted lines in fig. 3, to avoid interfering with the axle of the roller E.

Metallic braces, $m$, may be applied to the frame of the machine, as shown in fig. 1.

The coupling $o$ may be used to attach a tumbling-rod from a horse-power.

What I claim as my invention, and desire to secure by Letters Patent, is—

1. A feed-cutter, embracing in its construction the feed-rollers D and E, adjustable cutting-knives $d$, worm-gears $f, j$, and F, all the parts being constructed, arranged, and operating conjointly, as and for the purposes set forth.

2. In combination with the cutters $d$ and feed-rollers D and E, of feed-cutters, the clutch-coupling $h$, sliding clutch $h'$, and pulley C, as shown and described, for the purposes set forth.

GEORGE PARNELL.

Witnesses:
F. H. CLEMENT,
WM. S. LOUGHBOROUGH.